(12) United States Patent
Fromentoux et al.

(10) Patent No.: US 11,394,787 B2
(45) Date of Patent: Jul. 19, 2022

(54) METHOD FOR ROUTING DATA OF A SESSION INITIALIZED BETWEEN A TERMINAL AND A SERVER

(71) Applicant: ORANGE, Issy-les-Moulineaux (FR)

(72) Inventors: Gael Fromentoux, Chatillon (FR); Frederic Fieau, Chatillon (FR); Emile Stephan, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 27 days.

(21) Appl. No.: 16/768,410

(22) PCT Filed: Nov. 29, 2018

(86) PCT No.: PCT/FR2018/053047
§ 371 (c)(1),
(2) Date: May 29, 2020

(87) PCT Pub. No.: WO2019/106308
PCT Pub. Date: Jun. 6, 2019

(65) Prior Publication Data
US 2020/0389527 A1    Dec. 10, 2020

(30) Foreign Application Priority Data
Dec. 1, 2017  (FR) .................... 1761552

(51) Int. Cl.
*H04L 67/141* (2022.01)
*H04L 69/326* (2022.01)
(Continued)

(52) U.S. Cl.
CPC .......... *H04L 67/141* (2013.01); *H04L 69/326* (2013.01); *H04W 12/02* (2013.01); *H04W 48/18* (2013.01); *H04W 76/11* (2018.02)

(58) Field of Classification Search
None
See application file for complete search history.

(56) References Cited

U.S. PATENT DOCUMENTS 10,588,022 B2 * 3/2020 Mouquet ............... H04W 16/02
2016/0073327 A1 * 3/2016 Clougherty ......... H04L 12/4633
370/254
(Continued)

FOREIGN PATENT DOCUMENTS

CN    106851589 A1    6/2017
WO    2017200978 A1    11/2017

OTHER PUBLICATIONS

3GPP TR 23.799 v2.0.0, "Wireless technology evolution towards 5G, 3GPP release 13 to 15 and beyond" 5G Americas, dated Feb. 2017, 243 pages.
(Continued)

*Primary Examiner* — Backhean Tiv
(74) *Attorney, Agent, or Firm* — David D. Brush; Westman, Champlin & Koehler, P.A.

(57) ABSTRACT

A method for routing data of a session initialized between a terminal and a server, over a first network slot corresponding to a set of data-processing functions of a communication infrastructure, implemented by the terminal. This method includes receiving from the server at least one routing identifier determined as a function of at least one communication parameter of the session, configuring session information as a function of the at least one identifier received, and emitting to the server subsequent data of the session routed over at least one second slot corresponding to the configured information.

14 Claims, 6 Drawing Sheets

Figure 1:
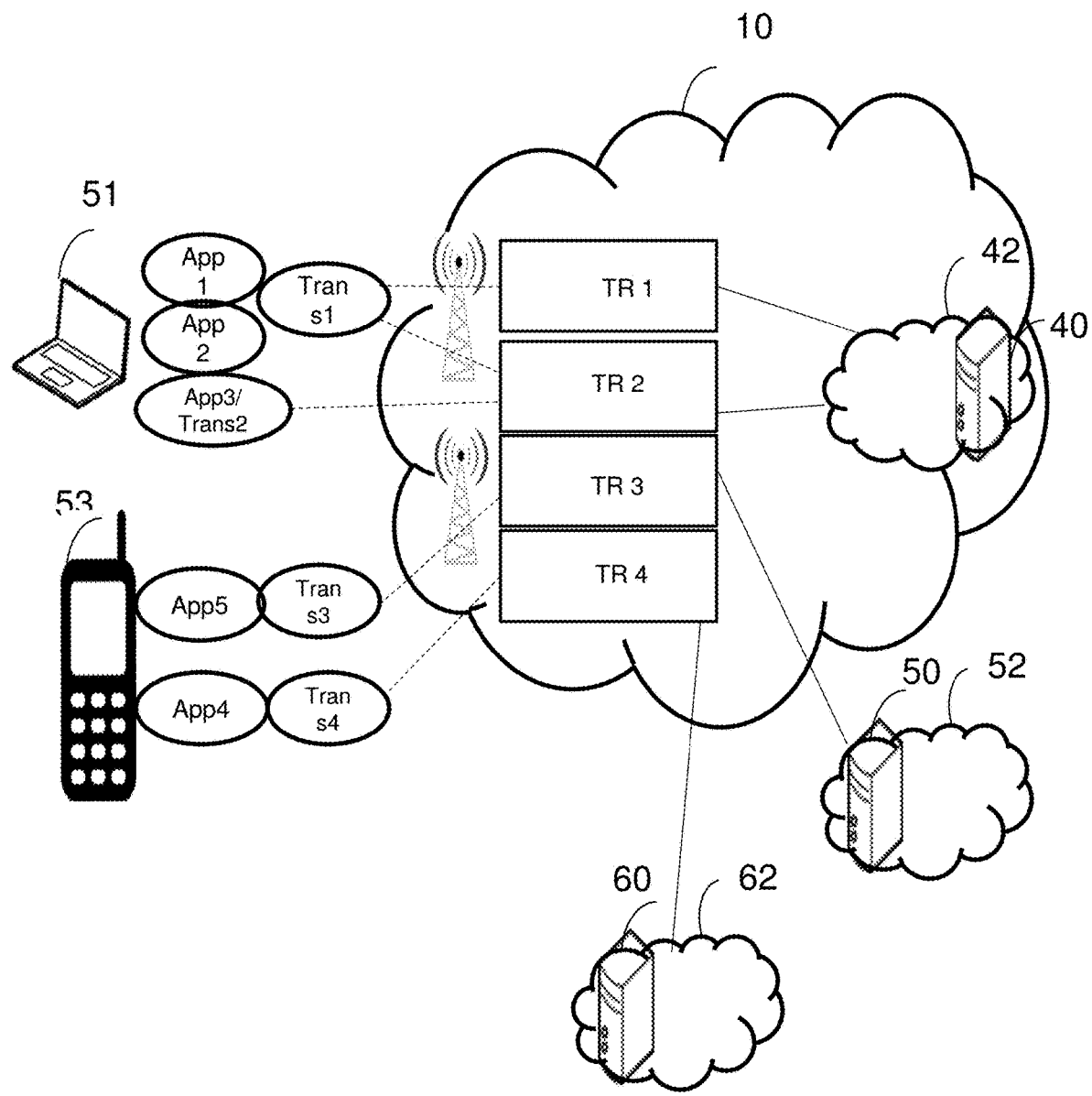

(51) Int. Cl.
*H04W 76/11* (2018.01)
*H04W 48/18* (2009.01)
*H04W 12/02* (2009.01)

(56) References Cited

U.S. PATENT DOCUMENTS

| | | | | |
|---|---|---|---|---|
| 2017/0164212 A1* | 6/2017 | Opsenica | ................ | G06F 16/41 |
| 2017/0164229 A1* | 6/2017 | Callard | ............ | H04W 28/0278 |
| 2017/0245316 A1* | 8/2017 | Salkintzis | ............ | H04W 48/16 |
| 2017/0289791 A1* | 10/2017 | Yoo | .................... | H04W 68/005 |
| 2017/0303259 A1* | 10/2017 | Lee | ........................ | H04W 28/16 |
| 2017/0318450 A1* | 11/2017 | Salkintzis | ............ | H04W 48/14 |
| 2017/0367036 A1* | 12/2017 | Chen | .................... | H04W 48/16 |
| 2018/0176858 A1* | 6/2018 | Wang | .................... | H04W 48/10 |
| 2018/0192445 A1* | 7/2018 | Jiang | ................ | H04W 72/0466 |
| 2018/0249375 A1* | 8/2018 | Goldhamer | ........... | H04L 1/1812 |
| 2018/0316779 A1* | 11/2018 | Dowlatkhah | ......... | H04W 24/02 |
| 2018/0324577 A1* | 11/2018 | Faccin | ................. | H04W 48/18 |
| 2018/0324645 A1* | 11/2018 | Park | ..................... | H04W 36/08 |
| 2018/0332441 A1* | 11/2018 | Shaw | .................... | H04L 63/105 |
| 2018/0352592 A1* | 12/2018 | Zhu | ................... | H04W 36/0033 |
| 2018/0376338 A1* | 12/2018 | Ashrafi | ................... | H04L 67/10 |
| 2019/0021010 A1* | 1/2019 | Senarath | ................ | H04W 16/10 |
| 2019/0026094 A1* | 1/2019 | Stammers | ............. | H04W 24/02 |
| 2019/0029065 A1* | 1/2019 | Park | ....................... | H04W 12/06 |
| 2019/0124561 A1* | 4/2019 | Faccin | .................... | H04W 8/02 |
| 2019/0124704 A1* | 4/2019 | Sun | ........................ | H04W 28/24 |
| 2019/0150081 A1* | 5/2019 | Qiao | ..................... | H04W 48/18 |
| | | | | 370/329 |
| 2019/0159117 A1* | 5/2019 | Kuge | ..................... | H04W 8/08 |
| 2019/0191367 A1* | 6/2019 | Ni | ......................... | H04W 76/11 |
| 2019/0223093 A1* | 7/2019 | Watfa | .................... | H04W 48/18 |
| 2019/0261233 A1* | 8/2019 | Duan | .................... | H04W 36/14 |
| 2019/0327149 A1* | 10/2019 | Sun | .................... | H04L 41/0893 |
| 2019/0357122 A1* | 11/2019 | Li | ......................... | H04W 76/18 |
| 2019/0373520 A1* | 12/2019 | Sillanpää | ............. | H04W 24/02 |
| 2020/0022033 A1* | 1/2020 | Wei | ................ | H04W 36/0072 |
| 2020/0077327 A1* | 3/2020 | Duan | .................... | H04W 48/18 |
| 2020/0112861 A1* | 4/2020 | Yao | ........................ | H04W 88/18 |
| 2020/0120580 A1* | 4/2020 | Jin | ........................ | H04W 74/00 |
| 2020/0120590 A1* | 4/2020 | Trivisonno | ........... | H04W 60/005 |
| 2020/0137576 A1* | 4/2020 | Hu | ........................ | H04W 48/18 |
| 2020/0169921 A1* | 5/2020 | Zhu | ........................ | H04W 16/02 |
| 2020/0178139 A1* | 6/2020 | Shimojou | .............. | H04W 92/24 |
| 2020/0187061 A1* | 6/2020 | Zhu | .................... | H04W 36/0033 |
| 2020/0235989 A1* | 7/2020 | Sun | ........................ | H04W 24/02 |
| 2020/0259786 A1* | 8/2020 | Saarinen | ................. | H04L 63/04 |
| 2020/0260330 A1* | 8/2020 | Zhu | ........................ | H04W 40/24 |
| 2020/0275338 A1* | 8/2020 | Quintuna Rodriguez | ................... | H04W 36/30 |
| 2020/0389527 A1* | 12/2020 | Fromentoux | ......... | H04L 69/326 |
| 2021/0195509 A1* | 6/2021 | Ohlsson | ................ | H04W 12/02 |
| 2021/0243686 A1* | 8/2021 | Baek | ..................... | H04W 72/02 |

OTHER PUBLICATIONS

T. Pauly et al., "A Survey of Transport Security Protocols draft-pauly-taps-transport-security-00", Network Working Group Internet-Draft, dated Jul. 3, 2017, 22 pages.

J. Iyengar et al., "QUIC: A UDP-Based Multiplexed and Secure Transport draft-ietf-quic-transport-07", Internet-Draft, Oct. 13, 2017, 82 pages.

3rd Generation Partnership Project; Technical Specification Group Services and System Aspects; Study on Architecture for Next Generation System (Release 14), 3GPP TR 23.799 V2.0.0 (Nov. 2016), Technical Report, 523 pages.

3rd Generation Partnership Project; Technical Specification Group Services and System Aspects; System Architecture for the 5G System; Stage 2 (Release 15), 3GPP TS 23.501 V1.5.0 (Nov. 2017), Technical Specification, 170 pages.

G. Fairhurst et al., "Services Provided by IETF Transport Protocols and Congestion Control Mechanisms," Internet Engineering Task Force (IETF), ISSN: 2070-1721, dated Mar. 2017, 54 pages.

M. Belshe et al., "Hypertext Transfer Protocol Version 2 (HTTP/2)," Internet Engineering Task Force (IETF), ISSN: 2070-1721, dated May 2015, 96 pages.

English translation of the Written Opinion of the International Searching Authority dated Jun. 2, 2020 for corresponding International Application No. PCT/FR2018/053047, filed Nov. 29, 2018.

International Search Report dated Jan. 30, 2019 for corresponding International Application No. PCT/FR2018/053047, filed Nov. 29, 2018.

Written Opinion of the International Searching Authority dated Jan. 30, 2019 for corresponding International Application No. PCT/FR2018/053047, filed Nov. 29, 2018.

* cited by examiner

METHOD FOR ROUTING DATA OF A SESSION INITIALIZED BETWEEN A TERMINAL AND A SERVER

CROSS-REFERENCE TO RELATED APPLICATIONS

This Application is a Section 371 National Stage Application of International Application No. PCT/FR2018/053047, filed Nov. 29, 2018, which is incorporated by reference in its entirety and published as WO 2019/106308 A1 on Jun. 6, 2019, not in English.

1. TECHNICAL FIELD

The application for the invention lies within the field of telecommunications infrastructures and techniques relating to what are known in English as "network slices".

2. PRIOR ART

Before the 4G mobile network generation that is currently being deployed in most countries, network architectures were most commonly based on highly specific equipment dedicated to certain precise functions in both the access network and the core network, notably in relation to the transmission of packets to or from a mobile terminal. In the network infrastructures deployed up to the present time, a single set of functions is used regardless of the type of traffic. Thus the various session flows pass through the same set of functions (routing, addressing, data flow control, naming, etc.).

Owing to the lack of flexibility and scalability inherent in this type of conventional architecture, consideration has been given to the adoption of more flexible architectures for the next generations of mobile networks, starting with the generation called 5G, to allow a rapid response to demands which are highly varied in terms of traffic or quality of service. It should be noted that 5G networks are intended to cover both mobile and fixed networks. The techniques involved in the development of 5G networks are therefore applicable to both fixed and mobile infrastructures.

Among the solutions considered, one of the most promising is based on a technique of dividing up the network into slices ("network slicing" in English).

This is because 5G will have to support widely varying cases of use and meet extreme requirements (e.g. in terms of speed, energy efficiency, variety of equipment, fragmentation of actors, etc.), for which flexibility and scalability of networks will be essential. The technique of network slicing, which may be considered as a technique for implementing specific instances of communication paths on the same physical infrastructure, usually on the basis of techniques concerned with virtualization. This technique enables the operator to create networks adapted to different requirements (operator, service provider, clients) and to provide solutions meeting the various requirements of different market sectors. These solutions are optimized, for example, in terms of routing functions, performance and isolation between applications or between clients.

At the present time, according to the known art, a number of methods are under consideration for assigning a network "slice" (as it is known in English) to a terminal, and are the subject of proposals, notably regarding standardization (3GPP TR 23.799 v2.0.0 December 2016 or Wireless technology evolution towards 5G, 3GPP release 13 to 15 and beyond—5G Americas—February 2017—pp. 163-167).

There are no solutions that assign a slice on the basis of the technical solutions deployed or in the course of deployment by the suppliers of applications, also called "third parties" in English in some documents. These third parties also play a part in sectors considered to be "vertical" ("Smart City" as it is known in English, Health, etc.) in the terminology used in the 5G network specifications, as well as in the provision of communication services ("Communication Service Providers" (CSPs) in English), also called "Over The Top" (OTT). This is because these third parties have their own technical infrastructure enabling services to be provided to clients via the internet and fixed or mobile networks. These technical infrastructures are composed, notably, of servers, caches, and routing and flow processing service platforms which use specialized or standardized technical solutions. It should be noted that these technical infrastructures may also use techniques relating to "network slices" and associate a slice with traffic characteristics, notably.

However, there is no solution that provides visibility of the slices at the terminal or server ends. Thus it is not possible, for example, to assign a slice on the basis of communication characteristics of OTT applications, in the transport and/or application layer for example, in a context where these are undergoing significant evolution, notably because of the actions of third parties.

The object of the present invention is to overcome some drawbacks of the techniques currently used.

3. DISCLOSURE OF THE INVENTION

The invention is intended to improve the situation by means of a method for routing data of a session initialized between a terminal and a server, over a first network slice corresponding to a set of functions for processing the data of a communication infrastructure, implemented by the terminal and characterized in that it comprises the following steps:

receiving from the server at least one routing identifier determined on the basis of at least one communication parameter of the session, configuring a piece of session information on the basis of the at least one identifier received, transmitting to the server subsequent data of the session routed over at least a second slice corresponding to the configured information.

According to the prior art, the dynamic selection of a network slice is either carried out by the terminal, if it holds a piece of information enabling it to select a slice corresponding to traffic, terminal, or application characteristics, or to a combination of these pieces of information, or is executed by the operator of the communication infrastructure. As a result of this invention, the remote server detects that a network slice selected for the session is not suitable for parameters of the communication. It is assumed here that a session may be single-path or multi-path, and is characterized by end-to-end communication between the terminal and the server for one or more applications. A communication parameter of a session is characterized by a piece of information transmitted or received by one or other of the ends of the session, in the present case the terminal or the server. A communication parameter is not specific to a layer of the OSI (Open Systems Interconnection in English) model.

The first slice chosen by the terminal may, notably, be unsuitable because the session data will not be processed by the correct equipment when they are routed. Consequently these data may not benefit from advanced processing functions, or, for example, may not be secured. The server then determines that a new slice must be used by the terminal for this session. This determination is carried out on the basis of communication parameters that are present either in headers of the packets or in frames used for routing data, or in the application data of the session. When the server has determined one or more new routing identifiers, it notifies this to the terminal. It should be noted that a session may be multi-path and therefore also multi-slice, and that a plurality of network slices will be used to route the session data for one session. For example, one slice is used for the real-time data and one slice is used for the non-real-time data of the session.

The terminal then transmits the supplementary data of the session, modifying these data by configuring a piece of session information and thus enabling these data to be routed over one or more different slices, on the basis of the configured piece of session information. For example, the terminal may configure a piece of information of a field of the SFC (Service Function Chaining in English) protocol. The session data are thus transmitted over the network slices corresponding to the configured parameter, the network manager assigning one or more slices corresponding to the configured piece of information. The terminal may itself select the new network slice or slices. In this case, the piece of session information is one or more identifiers of slices. According to another example, the selection of a second network slice or of a plurality of network slices is carried out by another device within the infrastructure routing the session data.

Thus this method enables a terminal to route the data of a session on the basis of the recommendations of a remote server, the latter thus being able, for example, to provide processing which is specific to the session data without systematically analyzing the content of the session packets or frames, thereby saving resources and allowing faster processing.

According to a particular characteristic, the session is ciphered by the terminal and deciphered by the server.

A session ciphered and deciphered by the two ends, namely the terminal and the server, means that the intermediate devices cannot access certain pieces of information transmitted between the terminal and the server. Thus the pieces of information used for data routing are not usually ciphered, whereas the pieces of information relating to applications are ciphered. Since the server is the only device that can access the ciphered data, it can use them to intervene in the choice of the network slice that routes the data in the infrastructure.

According to a particular characteristic, the session is initialized by the terminal by configuring a default piece of session information.

If no information relating to the routing identifier is obtained by the terminal, the data of a session must still be transmitted over a first slice of the communication infrastructure. If the terminal does not configure any information, the communications network manager selects a first slice by default. Thus the terminal selects a default piece of information, corresponding to the application or the remote server of the session for example, so that the session data transmitted before a routing identifier is sent by the remote server, or where no such identifier is sent, has the benefit of a first network slice for routing the data.

According to a particular characteristic, the piece of session information is a data element relating to a piece of NSSAI information.

The piece of session information configured by the terminal may advantageously relate to the NSSAI (Network Slice Selection Assistance Information) information. This information, defined in 3GPP (document TS 23.501, version 1.5.0, 13 Nov. 2017) may advantageously be used, notably because of its probable extensive use in communications networks. Thus the data comprising this NSSAI information may be routed over a network slice implemented by an infrastructure manager, independently of the contracts or relations between infrastructure manager and the user of the terminal.

According to a particular characteristic, the terminal stores in memory the at least one identifier received on the basis of the communication parameters of the session.

In order to limit the exchanges between the server and the terminal, the terminal may advantageously store the routing identifiers received for previous sessions, as well as the communication parameters of the corresponding sessions, so that these identifiers are re-used in a forthcoming session having the same communication parameters. The first data transmitted may thus be routed over a network slice suitable for the session data, by configuring a piece of session information corresponding to the stored identifier. However, the server may transmit another identifier for this new session to the terminal, if another slice is more suitable, or if the first slice initially used for routing the data is exhibiting problems, for example.

The various aspects of the routing method described above may be implemented independently of one another or in combination with one another.

According to a second aspect, the invention also relates to a method for determining at least one routing identifier of data of a session initialized between a terminal and a server, over a first network slice corresponding to a set of functions for processing the data of a communication infrastructure, implemented by the server and characterized in that it comprises the following steps:

determining at least one routing identifier on the basis of at least one communication parameter of the session, transmitting to the terminal the at least one identifier determined, receiving from the terminal subsequent data of the session routed over at least a second slice.

On receiving data transmitted by a terminal, a server identifies that the first network slice used for routing the data is unsuitable. If, for example, a set of processes is associated with a network slice, the result of the selection of an unsuitable first network slice by the terminal is that processes are not applied to the session data. On the basis of communication parameters, such as an address of the terminal, a quality of service parameter, or a transport protocol parameter, the server establishes that a more suitable second slice (or a plurality thereof) must be selected, and determines this new slice on the basis of different parameters. This method enables the server to dynamically update a use of one or more second network slices for the session data transmitted by a terminal. This method may, for example, be implemented in order to allow for problems occurring on the infrastructure, or to allow for new requirements expressed by the entity responsible for the server, or by an external entity that has issued a request to the server. Additionally, in the case of ciphered data sessions, the server is the only entity able to access ciphered communication parameters, giving it powers to determine routing identifiers that intermediate devices do not have.

According to a particular characteristic, the at least one parameter relates to the transport layer of the session.

The transport layer of communications networks is rapidly evolving, and also includes an increasing number of elementary processing functions. "Multi-path" transport protocols are also being developed. The server may advantageously make use of the functional wealth of the transport parameters to determine one or more second network slices for routing the data on the basis of these parameters. These parameters are also increasingly ciphered, and it is useful for the server to make use of the access to these parameters that it has deciphered in order to adapt the data processing by determining a routing identifier for routing the data over one or more network slices. The TLS (Transport Layer Security in English) protocol is, notably, one of the main transport protocols providing security for the transmitted data. Since the data transported under the TLS protocol are accessible to the terminal and the server only, the server may, for example, use the TLS parameters to determine a routing identifier suitable for the parameters of the TLS protocol, these data possibly being common to a plurality of applications.

According to a particular characteristic, the at least one parameter relates to the QUIC protocol.

The QUIC (Quick UDP Internet Connections in English) transport protocol specified in the document "draft-ietf-quic-transport-07", 13 Oct. 2017, is a transport protocol that is increasingly used in communications networks. This protocol comprises a large number of pieces of information, including information relating to the multi-attachment context, security information and information relating to the data flow. Its wealth in terms of elementary functions and its increasing use make this protocol particularly relevant for the determination of a routing identifier.

According to a particular characteristic, the at least one parameter relates to a protocol version of the transport layer.

The transport protocols, notably those in the course of specification in the standardization bodies, are evolving in a fairly regular way in line with the versions proposed. Thus a version of a protocol may incorporate quality of service or security parameters that did not exist in the previous version. This is the case, notably, with the different versions of the QUIC protocol. The data of a session may thus require specific processing, according to the characteristic parameters of a protocol version. The protocol version may advantageously provide information on the processing required, and the determination of the routing identifier on the basis of the protocol version may be adapted to the requirements of the server manager.

According to a particular characteristic, the at least one identifier is transmitted in a transport protocol data element.

For transmitting the determined routing identifier to the terminal, the server may use a transport protocol. In fact, the transport protocol is fairly rapidly evolving and regularly comprises new functions. This is the case, for example, with the QUIC or MPTCP (MultiPath Transport Control Protocol in English) protocols. Additionally, transport protocols are end-to-end protocols, with no modification possible if the protocol is ciphered. It would therefore appear to be useful to transmit the routing identifier in the transport protocol so that it arrives reliably and without modification at the terminal, which can then exploit it for configuring a piece of session information.

The various aspects of the method of determination described above may be implemented independently of one another or in combination with one another.

According to a third aspect, the invention relates to a device for routing data of a session initialized between a terminal and a server, over a first network slice corresponding to a set of functions for processing the data of a communication infrastructure, implemented by the terminal and characterized in that it comprises:

a receiver for receiving from the server at least one routing identifier determined on the basis of at least one communication parameter of the session, a configuration module for configuring a piece of session information on the basis of the at least one identifier received, a transmitter for transmitting to the server subsequent data of the session routed over at least a second slice corresponding to the configured information.

This device, capable of implementing the routing method described above in all its embodiments, is intended to be implemented in an end equipment of the terminal type.

According to a fourth aspect, the invention also relates to a device for determining at least one routing identifier of data of a session initialized between a terminal and a server, over a first network slice corresponding to a set of functions for processing the data of a communication infrastructure, implemented by the server and characterized in that it comprises:

a determination module, for determining at least one routing identifier determined on the basis of at least one communication parameter of the session, a transmitter, for transmitting to the terminal the at least one identifier determined, a receiver, for receiving from the terminal the subsequent data of the session routed over at least a second slice.

This device is capable of implementing the determination method described above in all its embodiments. This device is intended to be implemented in an end equipment of the data server type.

According to a fifth aspect, the invention also relates to a system for routing data of a session initialized between a terminal and a server, over a first network slice corresponding to a set of functions for processing the data of a communication infrastructure:

a terminal comprising a routing device, a server comprising a determination device.

The invention also relates to a computer program comprising instructions for implementing the steps of the routing method described above, when this program is executed by a processor.

The invention also relates to a computer program comprising instructions for implementing the steps of the determination method described above, when this program is executed by a processor.

These programs can use any programming language, and can be in the form of source code, object code, or a code intermediate between source and object code, such as a code in partially compiled form, or any other desirable form.

The invention also proposes a computer-readable data medium comprising instructions of the computer programs as mentioned above.

The data medium may be any entity or device capable of storing the programs. For example, the medium may comprise a storage means such as a ROM, for example a CD-ROM or a microelectronic circuit ROM, or a magnetic recording means such as a diskette (floppy disk) or a hard disk.

On the other hand, the data medium may be a transmissible medium such as an electrical or optical signal which may be routed via an electrical or optical cable, by radio or by other means. The program according to the invention can, in particular, be downloaded from a network such as the internet.

Alternatively, the data medium may be an integrated circuit in which the program is incorporated, the circuit being adapted to execute, or to be used in the execution of, the methods in question.

4. DESCRIPTION OF THE FIGURES

Figure 2:
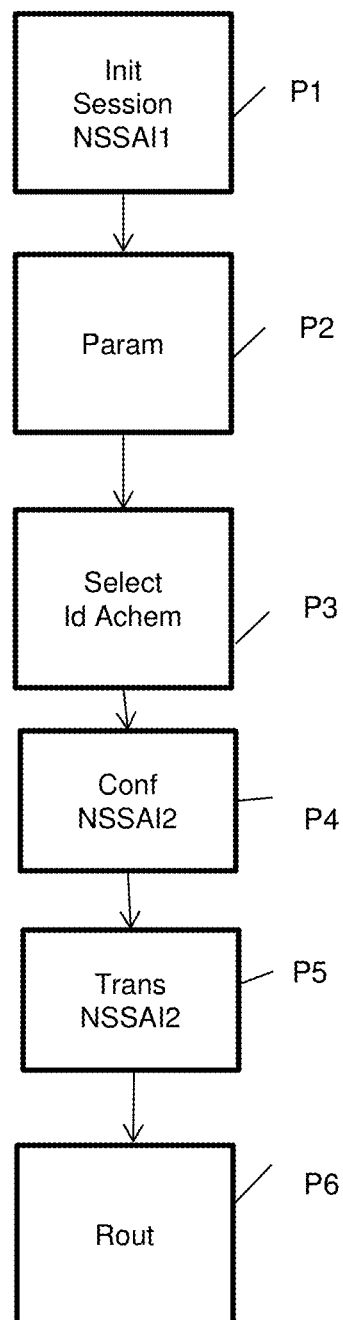
Figure 3:
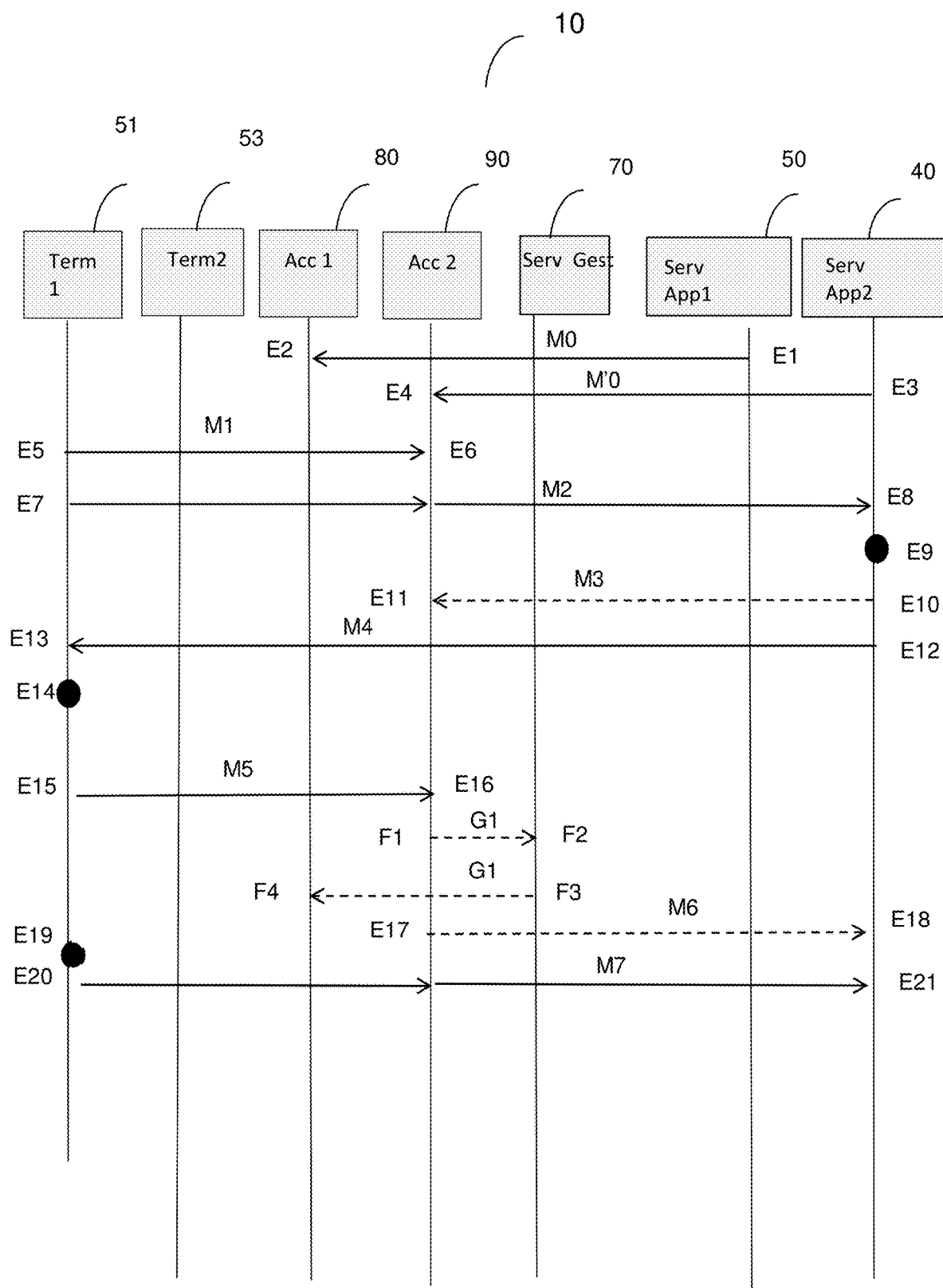
Figure 4:
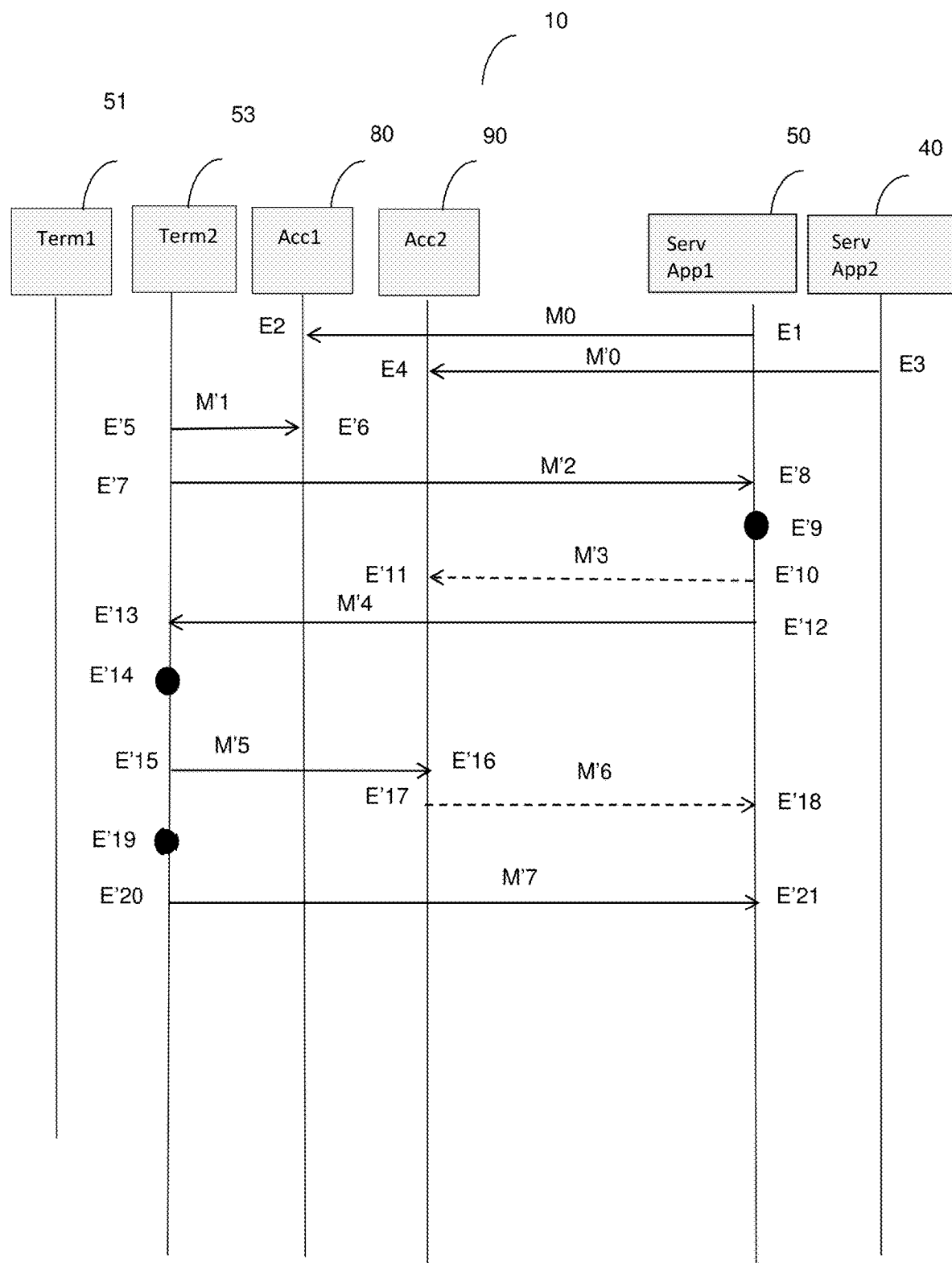
Figure 5:
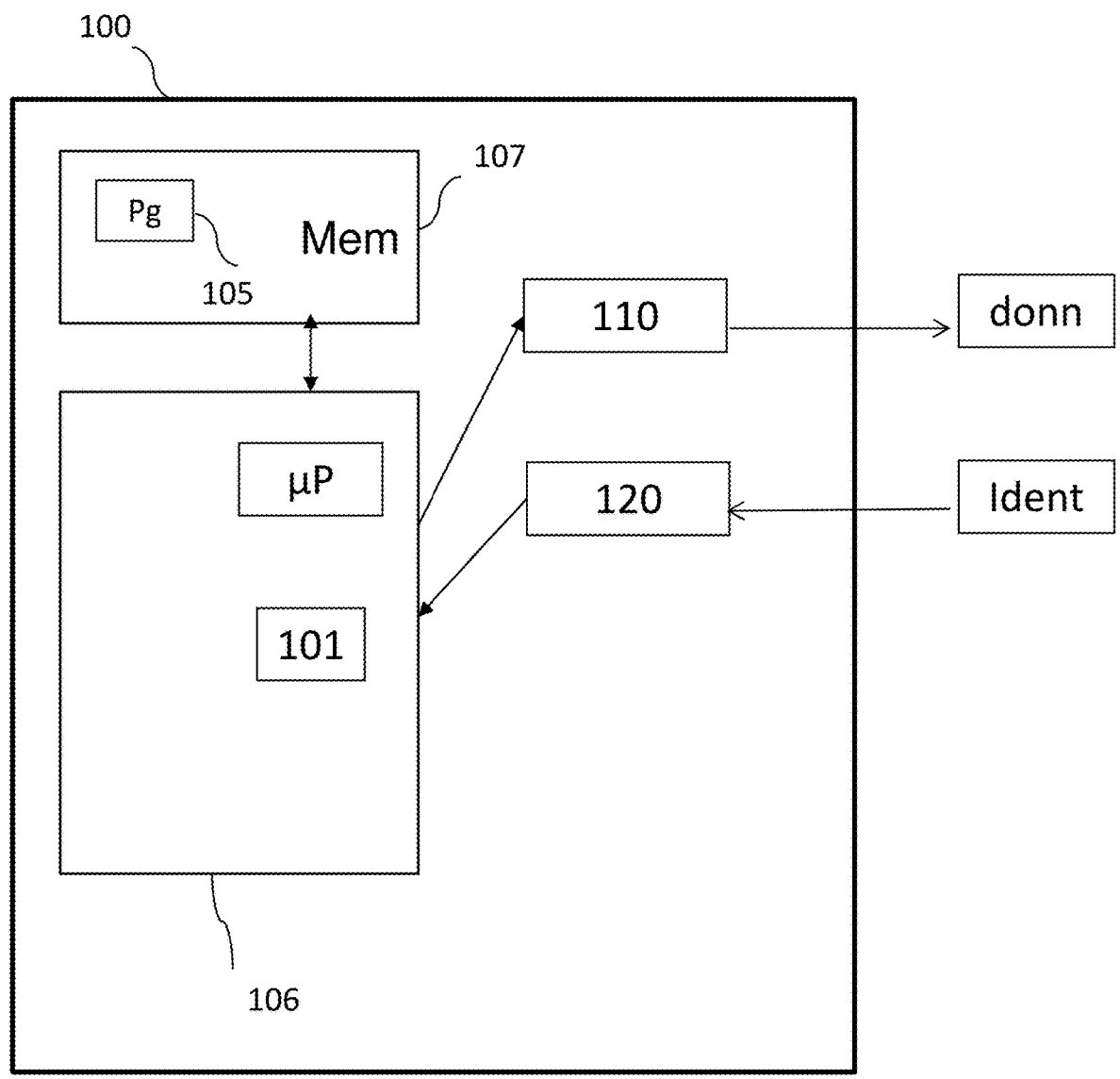
Figure 6:
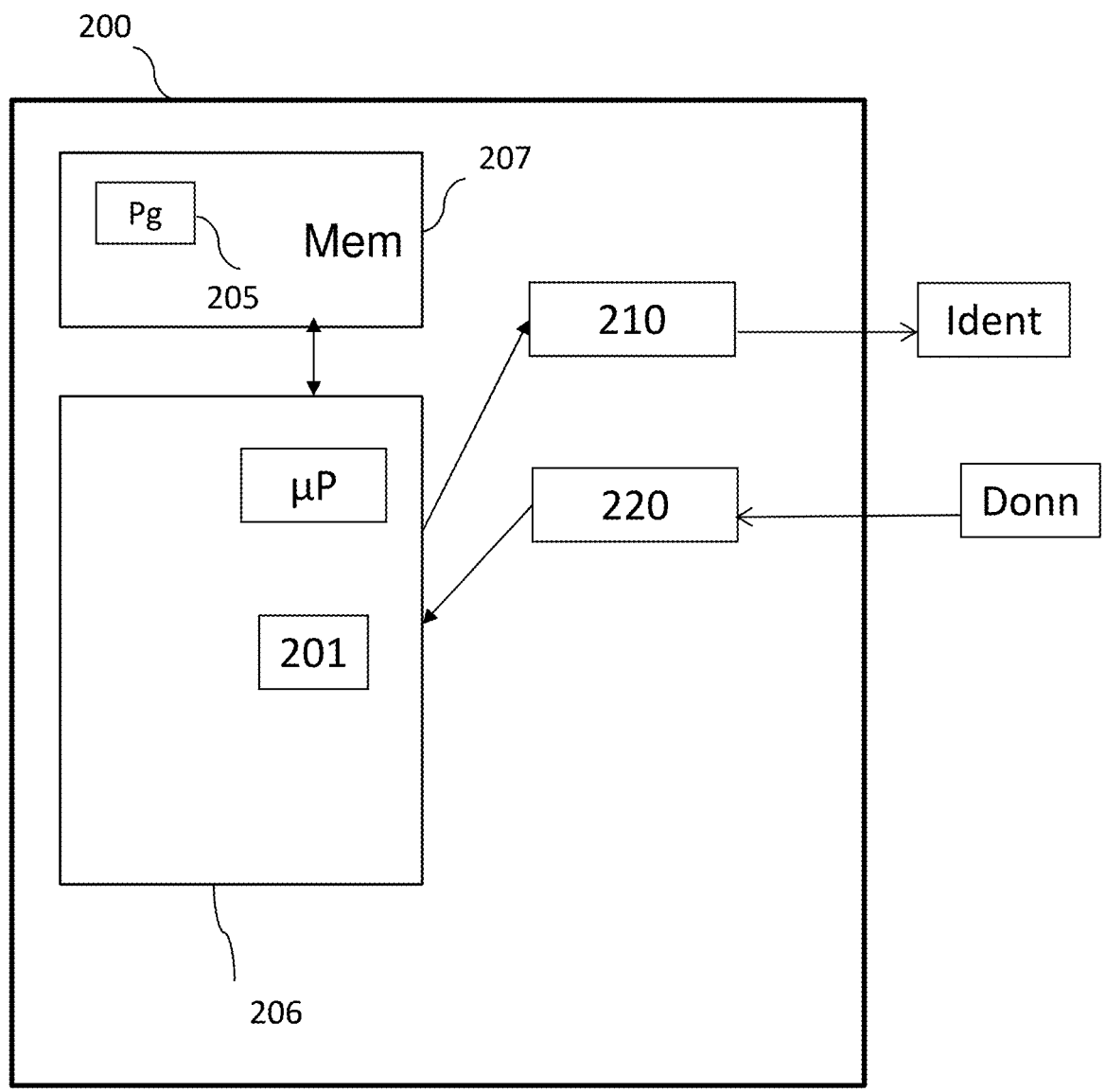

Other advantages and characteristics of the invention will be more clearly apparent from a reading of the following description of a particular embodiment of the invention, provided by way of a simple illustrative and non-limiting example, and from the appended drawings, of which:

FIG. 1 shows a simplified view of a communications infrastructure implementing the data routing method according to an aspect of the invention, FIG. 2 shows an outline of the data routing method according to a first embodiment of the invention, FIG. 3 shows an outline of the data routing method according to a second embodiment of the invention, FIG. 4 shows an outline of the data routing method according to a third embodiment of the invention, FIG. 5 shows an example of a structure of a routing device according to an aspect of the invention;

FIG. 6 shows an example of structures of a determination device according to an aspect of the invention.

5. DETAILED DESCRIPTION OF AT LEAST ONE EMBODIMENT OF THE INVENTION

In the remainder of the description, examples of a number of embodiments of the invention in a communication infrastructure, which may be fixed and/or mobile, are presented.

Reference should be made initially to FIG. 1, which shows a simplified view of a communications infrastructure implementing the data routing method according to an aspect of the invention.

In FIG. 1, two terminals 51 and 53 are attached to a communication infrastructure 10. At the terminal 51, three applications App1, App2 and App3 are activated. The data flows relating to the applications App1 and App2 are routed by a transport layer Trans1. The data flows of the application App3 of the terminal 51 are routed over another transport layer Trans2. The transport layers Trans1 and Trans2 may be completely distinct, that is to say based on different protocols, such as TCP (Transport Control Protocol in English) and UDP (User Datagram Protocol in English). According to another example, the two transport layers Trans1 and Trans2 may be different versions of the same protocol, such as QUIC version1 and QUIC version2. According to yet another example, Trans1 and Trans2 may be the same protocol version but with different configurations. At the terminal 53, the applications App4 and App5, whose data flows are respectively routed by the transport layers Trans4 and Trans3. In the remainder of the document, the data of an application App1 on a transport layer Trans1 will be denoted the data App1/Trans1.

It is assumed that the application App1/Trans1 of the terminal 51 establishes a data session with the server 40 installed in a local network 42. The server may, for example, be an HTTP (HyperText Transfer Protocol in English) server, and the local infrastructure 42 may be a server farm. The application App2/Trans1 establishes a session with the server 40. The application App3/trans2 establishes a session with the server 40. The application App5/trans3 establishes a data session with the server 50 of the local network 52. The application App4/Trans4 establishes a session with the server 60 of the local network 62. The local network 42, like the networks 52 and 62, may also comprise devices for processing the data flows, such as firewalls or optimization functions, without limitation.

The communications infrastructure 10 is organized in slices allowing data flows having common characteristics in terms of routing, quality of service or security to be routed over the same slice. It should be noted that the structuring of the slices and the association of the data flows over the different slices is the responsibility of the communications infrastructure manager 10. The slices of the infrastructure may, in an alternative arrangement, be implemented solely in the infrastructure 10, or may be instantiated in the infrastructure 10 and the terminals 51 and 53 and/or the local networks 42, 52, 62. In FIG. 1, it is assumed that the data flows App1/Trans1 are routed to the server 40 over a network slice Tr1. The data flows App2/Trans2 and the data flow App3/Trans2 are routed over a slice TR2 to the same server 40. The data flows App5/Trans3 are routed to the server 40 over a slice TR3, and the flows App4/Trans4 are routed to the server 60 over a slice TR4.

It should also be noted that the same server may host a plurality of applications, as is the case in FIG. 1 for the server 40 which hosts the application App1, App2 and App3. The network slices implemented may be specific to the infrastructure 10. In this case, the manager does not transmit any information over the network slices of the infrastructure to the terminals or to the servers. In the case where, for example, the infrastructure manager 10 is also the manager of a terminal and/or of a server, or where a contract is concluded between the respective managers, a terminal and/or a server may be aware of the slices deployed by the infrastructure manager 10.

With reference to FIG. 2, an outline of the data routing method according to a first embodiment of the invention is shown.

The purpose of the synoptic diagram of FIG. 2 is to describe in a generic way the phases of implementation of the method in a communications infrastructure.

In a phase P1, a terminal initiates a session with a server. This may be an application session of the HTTP or FTP (File Transfer Protocol in English) type, or may be, but is not limited to, a P2P (Point-to-Point in English) session.

By default, on the initialization of the session, if the terminal has no session information sent by the server, the terminal configures a default piece of session information in the messages sent to the server. According to an example, this piece of session information may also be the last piece of information obtained from a server. This piece of information may be a specific field of a service chaining protocol such as SFC (Service Function Chaining in English) or a data element added in a protocol, for example a transport or application protocol, which may be used by the communication infrastructure routing data to the server.

If the piece of session information cannot be used directly for routing the session data over a slice, it is then interpreted by a device of the network responsible for directing the flows of the various sessions into the slices of the communication infrastructure. This device, on receiving the session data transmitted by the terminal, establishes a correspondence between the piece of session information and a slice, in order to transmit the session data over a slice, called the first slice. In this case, the session data are routed over a first default slice, in accordance with the default piece of information configured by the terminal. In the example described, the terminal adds a piece of session information NSSAI1 and the device of the communication infrastructure adds a first slice identifier, corresponding to the piece of session information NSSAI1 configured by the terminal. For example, it adds it in a field of the transport protocol used for routing the session data.

In phase P2, the server receives the session data transmitted by the terminal in phase P1 and determines that a new routing identifier must be used by the terminal for the remaining data of the session. To determine that a new routing identifier must be used by the terminal, the server analyzes the communication parameters of the session. Among these parameters, the server identifies, for example, the piece of session information NSSAI1 added by the terminal, and possibly other fields of the transport protocol and/or fields of the application protocol, different examples of which are shown in FIGS. 3 and 4. It may also be used for determining an identifier, namely the first slice identifier used by the communication infrastructure, if this identifier has been sent to it.

In phase P3, the server determines a routing identifier corresponding to the parameters analyzed in phase P2. The server manager will already be aware of the network slices implemented in the communications network routing the session data, and of their characteristics. The server selects at least one routing identifier whose characteristics correspond to the parameters of the session, and transmits it to the terminal. The routing identifier may be an identifier of a slice of the communication infrastructure, but it may also be a routing identifier belonging to the server and the terminal for which a correspondence with an identifier of a slice of the communication infrastructure must be established. The server transmits the identifier to the terminal in a field of a protocol used for the session, or alternatively transmits this information using a specific protocol. If the session is a session of the HTTP/TCP type, the server may send the piece of information in the HTTP protocol or the TCP protocol, or even use a different protocol.

On receiving the new identifier transmitted by the server, in phase P4, the terminal configures a new piece of session information NSSAI2, corresponding to the routing identifier received. According to an example, the piece of session information may be identical to the routing identifier. It may also be a piece of information to be updated in a protocol, such as a quality of service parameter. The session data are thenceforth transmitted with this updated piece of session information.

In phase P5, the terminal transmits the session data with the updated piece of session information, enabling the session data to be routed over a second network slice corresponding to the characteristics of the session, these characteristics being formalized with the piece of session information. The piece of session information is interpreted by a device of the network, and the device adds a second slice identifier to the data carried in the communication infrastructure, enabling them to be routed into a slice suitable for the characteristics of the session in phase P6.

It should be noted that the server and the device of the communication infrastructure possibly select a routing identifier and a second slice identifier on the basis of a piece of session information. These two entities must therefore be coordinated in advance so that their respective selections are consistent.

Reference will now be made to FIG. 3, which shows an outline of the data routing method according to a second embodiment of the invention.

In an initialization phase of the method, the server 50 App1, in a step E1, transmits a message to a device 80 Acc1 of the communication infrastructure 10 to communicate to it, in a message M0, routing identifiers that the device 80 must interpret in order to route the data of the data sessions to the server 50. For the sake of simplicity, the message M0 is directly transmitted to the device 80 in FIG. 3. In an alternative, the message M0 may be sent to a management server of the infrastructure 10, which in turn will transmit this information to the various access devices of the infrastructure 10, notably in order to prevent the various servers from communicating directly with the access devices. The message M0 may also comprise session characteristics relating to the routing identifiers, in such a way that the device 80 can select a network slice suitable for the session characteristics. According to an example, the routing identifiers may correspond to identifiers of slices used in the communication infrastructure and/or to data relating to routing options, for example when architectures of the CDN (Content Delivery Networks in English) are implemented. On receiving the message M0 in step E2, the device 80 can route the session data to the server 50 over the network slices of the communication infrastructure.

In a corresponding manner, the server 40 App2 transmits a message M'0 to the device 90 in a step E3, which the device 90 receives in a step E4. The server 40 is thus capable of routing the data to the server 40. For the sake of simplicity, the exchanges are not shown in the figure, but the respective servers 50 and 40 notify the devices 90 and 80 respectively in a corresponding way.

In a step E5, the terminal 51 Term 1 registers itself on the communication infrastructure by transmitting a message M1 to the device 90. The terminal 51 notifies the device 90 in this message of the default piece of session information used, so that a default network slice is pre-assigned by the device 90. The device 90, on receiving the message M1 in step E6, communicates this piece of information to the other devices, so that any device receiving the data from the terminal is capable of associating the default network slice.

In a step E7, the terminal 51 transmits a message M2 to the server 40 App2. This message M2 is a HELLO message of the HTTP/QUIC/UDP/IP type. The message M2 is routed in the communication infrastructure 10 in accordance with the default piece of session information which was added by the terminal 51 and for which the device 90 of the communication infrastructure associates a slice. The message M2, initially transmitted to the device 90 which then retransmits it to the server 40, comprises transport information of the QUIC protocol, including a piece of information relating to the version of the QUIC protocol used and a signaling compression algorithm version. On the basis of these received data, the server 40 App2 detects that the version of the QUIC protocol used is unsuitable, for example because a new version exists or because it is not appropriate for the application. The server also wishes the subsequent data transmitted from the terminal to be transported over a second network slice which is more suited to the characteristics of the application. According to an alternative, the server 40 uses information of the metadata type, for example information of the CDNI (Content Distribution Network Information in English) type, present in the data routed by the QUIC protocol in order to determine the routing identifier. The data may relate to the QUIC protocol, or may be application data routed by means of the QUIC protocol. The piece of session information present in the message M2, and corresponding here to the version of QUIC, must therefore be modified by the terminal 51. The server 40 determines, in a step E9, a new routing identifier enabling the session data to be routed over a second slice of the communications network 10 which is more suitable.

According to an example, if the routing identifier sent to the terminal 51 has not been communicated to the device 90 in step E3, the server transmits it in a message M3 to the device 90 in a step E10, together with the characteristics associated with this identifier, to ensure that the data having the characteristics corresponding to this identifier are routed in an appropriate second network slice. On receiving this message in step E11, the device 90 is capable of routing the session data, updated by the terminal on the basis of the routing identifier received, in a second network slice of the infrastructure 10.

In a step E12, the terminal 40 transmits a message M4 to the server 51, comprising a routing identifier. Thus the subsequent data of the session initialized by the terminal 51 by sending the message M2 are routed over a second network slice to match the characteristics of the session. According to this example, the server 40 transmits an HTTP/QUIC/UDP/IP message comprising a piece of information on the routing identifier to be used for the session, the identifier being inserted into a data element of the QUIC protocol. In this example, the server 40 transmits a piece of information on the NSSAI to the terminal 51, which receives it in step E13. The server 40 also instructs the terminal, in the message M4, to use a more recent version of the QUIC protocol. The routing identifier will consist of the piece of NSSAI information and the version of the QUIC protocol to be used.

In a step E14, the terminal 51 configures a piece of session information on the basis of the routing identifier received in the message M4. According to an example, the terminal 51 updates the version of the QUIC protocol in accordance with the content of the message M4, and inserts the identifier NSSAI into a data element of the QUIC protocol. In this example, the piece of session information is identical to the routing identifier received, but according to other examples the piece of session information may be different from the routing identifier received. In the case, notably, where the terminal 51 cannot insert the NSSAI information received because it does not support this option, it updates the version of QUIC, and possibly also inserts a supplementary piece of information, for example into a field of the transmitted message, for example a Flow Label and/or Traffic Class field of the datagram header IPv6 or the Type of service field of the datagram header IPv4.

In a step E15, the terminal 51 updates its registration on the communication infrastructure by transmitting a message M5 to the device 90. The terminal 51 notifies the device 90 in this message of the piece of session information configured in step E14, so that a second network slice is assigned by the device 90. The device 90, on receiving the message M5 in step E16, communicates this piece of information to the other devices of the infrastructure 10 so that any device receiving the data from the terminal is capable of associating the second network slice associated with the piece of session information. This communication with the other devices may be carried out, according to an alternative, via a management server 70 of the infrastructure 10, which will then be responsible for notifying the various access devices. According to this alternative, the device 90 transmits, in step F1, a message G1 comprising the piece of session information to the management server 71 which, when it receives it in step F2, retransmits it to the device 80 in a step F3. The device 80 accepts the message G1 in step F4 and is capable of associating a second slice with a message comprising the piece of session information received from the terminal 51.

According to an alternative, the device 90 notifies the server 40, in step E17, of the updating of the second network slice for the session data, by transmitting a message M6. This message M6 comprises the piece of session information configured by the terminal 51 and the associated slice, which enables the server 40 to ensure, on the one hand, that the device 40 is routing the session data over a suitable slice, and, on the other hand, to know the piece of session information configured by the terminal 51 for the session.

In a step E19, according to an alternative, the terminal stores the routing identifier received for the session. This storing enables the terminal to directly configure a suitable piece of session information, at the launch of a new session which has communication parameters identical to the previous one. Thus the first data of this new session are directly routed over a network slice corresponding to the characteristics of this new session.

In step E20, the terminal 51 transmits the session data in a message M7 to the server 40, these data being updated with the piece of session information configured by the terminal 51. These data are transmitted via the communication infrastructure 10, or more precisely the device 90, which routes the session data over a second network slice suitable for the characteristics of the session to the server 40.

According to an alternative, when the device 90 of the infrastructure associates a slice with a piece of session information of the message M7 transmitted by the terminal, it keeps data of the message M7 received in memory, so that the same slice can be associated with sessions having the same data. For example, the device 90 may keep data of the message M7 (source IP address, destination IP address, source port, destination port, protocol, version, slice identifier, TLS session ticket, QUIC connection identifier) in memory, in order to be able to associate messages with the selected slice. For example, some QUIC messages use short headers which do not include the version field, but which may nevertheless be associated with the slice selected for the message M7 because of the storage of the data associated with the slice in a previous session, for example. Additionally, the stored data may also be advantageously used for the assignment of a slice to messages transmitted by the server 40 to the terminal 51.

The server 40, on receiving the message M7 in step E21, accepts the session data transmitted by the terminal 51 and checks that the piece of session information configured by the terminal corresponds to the routing identifier transmitted in the message M4, also referring to the message M6 if necessary. According to this embodiment, the server E21 checks that the version of the QUIC protocol and the NSSAI information correspond to the data elements that it transmitted previously.

Reference will now be made to FIG. 4, which shows an outline of the data routing method according to a third embodiment of the invention.

Steps E1 to E4 are identical to the corresponding steps of FIG. 3.

In step E'5, the terminal 53 Term2 registers itself on the device 80 Acc2 by sending a message M'1. This registration step, in the case of a 5G network, enables the terminal 53, notably, to register itself on the NGRAN (New Generation Radio Access Networks in English) and enables the NGRAN, on receipt of the message M'1 in step E'6, to select an AMF (Access and Mobility Management Function in English) device according to the 3GPP TR 23.799 specification (version 14.0, Dec. 16, 2016).

In step E'7, the terminal 53 transmits a message M'2 to the server 50 Serv App2. The message M'2 is a message of the (HTTP/2)/TLS/IP type. On receiving the message M'2, the server 50 analyzes the communication parameters of the message M'2. Notably, it examines the parameters of the TLS transport protocol and the parameters of the HTTP2 protocol of the message M'2 transmitted by the terminal 53.

The communication parameters of the TLS protocol, as defined in section 5 of the document IETF RFC 8095 (March 2017) and in the IETF document https://tools.ietf.org/html/draft-pauly-taps-transport-security-00 (Jul. 3, 2015), are, notably, analyzed. The HTTP/2 parameters, as defined in the document IETF RFC 7540 (May 2015), are also analyzed by the server on receipt of the message M'2 in step E'8. It should also be noted that the terminal 53 has used a default first network slice identifier for transmitting the message M'2. According to this alternative, the terminal 53 itself inserts a first network slice identifier which the communication infrastructure 10 can use for routing the data transmitted by the terminal 53.

In step E'9, the server has analyzed the various parameters and has found that the network slice that has routed the message M'2, the identifier of which it has obtained in the message M'2, is not suitable for certain TLS and/or HTTP/2 parameters of the message M'2. On the basis of the parameters, the server 50 determines a new routing identifier for the next messages to be transmitted by the terminal 53 for this (HTTP/2)/TLS/IP session. According to this example, the determined routing identifier takes into account parameters such as ciphering (TLS), flow control (as it is known in English), HTTP/2 application flow multiplexing, and compression parameters. According to another example, and in order to optimize the determination of a routing identifier, the server 50 considers only the protocol versions for determining a routing identifier, because a set of parameters corresponds to a protocol version. By referring to a protocol version in the message M'2 received from the terminal 53, the server 50 knows that a certain number of parameters, from among those defined in the documents cited above, are or are not present in the message M'2.

Steps E'10 to E'13 are equivalent to steps E10 to E13 of FIG. 3, the only difference being that the message M'4 comprises a routing identifier comprising an identifier of a slice of the communication network 10, as well as the communication parameters to be updated for the terminal. According to an alternative, the server 50 may determine a plurality of routing identifiers so that the data transmitted by the terminal are routed over a plurality of network slices, called second slices, within the communication infrastructure. This alternative is, notably, facilitated by the development of multi-path protocols and the possibility of attaching terminals to a plurality of communication infrastructures simultaneously.

On receiving the message M'4, the terminal 53, in step E'13, configures the second slice identifier received in message M'4 in the messages of the data session to be transmitted to the server 50. This second slice identifier replaces the default first slice identifier that was initially used. The terminal 53 also updates the communication parameters transmitted by the server 50. This updating is optional. This is because, if the terminal is not capable of using these parameters, it cannot configure them in the messages to be transmitted.

Steps E'15 to E'19 correspond to steps E15 to E19 of FIG. 3.

In step E'20, the terminal 53 transmits the session data to the server 50, these data having been configured with the second network slice identifier of the communication infrastructure 10 received from the server 50. This embodiment is, notably, implemented where the terminal 53 and the server 50 on the one hand, and the communication infrastructure 10, are administered by a single manager, or where the managers of the terminal 53, the manager of the server 50 and the manager of the infrastructure 10 are working collaboratively. According to an alternative, the terminal 53 is capable of managing a plurality of network slices, and transmits the session data over the second network slice or slices whose identifier or identifiers have been communicated to it by the server 50.

The embodiments of FIGS. 2, 3 and 4 are not exclusive, and combinations of these embodiments are feasible.

With reference to FIG. 5, an example of a structure of a routing device according to an aspect of the invention is shown.

The routing device 100 implements the routing method, different embodiments of which have been described above.

Such a device 100 may be implemented in a terminal or more generally in an infrastructure access device (fixed terminal, mobile terminal, or box). The access device may be an equipment for residential or business customers, connected to a fixed or mobile network.

For example, the device 100 comprises a processing unit 106, fitted with a microprocessor μP for example, and controlled by a computer program 105 stored in a memory 107 and implementing the routing method according to the invention. On initialization, the code instructions of the computer program 105 are, for example, loaded into a RAM memory, before being executed by the processor of the processing unit 106.

Such a device 100 comprises:

a receiver 120, for receiving from the server at least one routing identifier determined on the basis of at least one communication parameter of the session, a configuration module 101, for configuring a piece of session information on the basis of the at least one identifier received, a transmitter 110, for transmitting to the server the subsequent data of the session routed over at least a second slice corresponding to the configured information.

With reference to FIG. 6, an example of a structure of a determination device according to an aspect of the invention is shown.

The routing device 200 implements the determination method, different embodiments of which have been described above.

Such a device 200 may be implemented in a server or more generally in an end device capable of establishing a session with a terminal.

For example, the device 200 comprises a processing unit 206, fitted with a microprocessor μP for example, and controlled by a computer program 205 stored in a memory 207 and implementing the routing method according to the invention. On initialization, the code instructions of the computer program 205 are, for example, loaded into a RAM memory, before being executed by the processor of the processing unit 206.

Such a device 200 comprises:

a determination module 201, for determining at least one routing identifier on the basis of at least one communication parameter of the session, a transmitter 210, for transmitting to the terminal the at least one identifier determined, a receiver 220, for receiving from the terminal the subsequent data of the session routed over at least a second slice.

The implementation of the routing method and of the determination method is valid for any type of infrastructure, whether fixed or mobile, including hybrid fixed and mobile networks, where a terminal is attached simultaneously to a fixed infrastructure and a mobile infrastructure. A multi-path session makes it possible, notably, to improve the data transmission speed as well as the data routing reliability. The routing method allows the implementation of multi-path architectures and makes it possible to select a network slice based on a plurality of different paths, or alternatively a plurality of network slices, each slice allowing data to be routed over one or more paths.

Thus a network slice can be assigned to a terminal for a given session regardless of the type of network, even if the terminal is multi-attached. In addition to multi-attachment, another trend in the evolution of infrastructure is concerned with the confidentiality of communications and consequently with the ciphering of data. This method is particularly suitable for this context, because, with only a few exceptions for requirements generally relating to the security functions deployed by governments, intermediate devices cannot access what is known as the payload information transmitted by terminals and/or servers. The routing method, based on the contribution of a terminal and a server for the assignment of a network slice to a given traffic, is entirely suitable for a context of ciphered communications. The intermediate devices routing the traffic still contribute to the method by exchanges with the terminal and/or the server, but without any need to decipher data transmitted in a field of the ciphered data intended for one or more clearly defined recipients.

The invention claimed is:

1. A routing method for routing data of an end-to-end session initialized between a terminal and an application server, over a first network slice corresponding to a set of data processing functions of a communication infrastructure, implemented by the terminal, and comprising:
receiving from the application server at least one routing identifier determined based on at least one communication parameter of the session,
configuring a piece of session information based on the at least one routing identifier received, and
transmitting to the application server subsequent data of the end-to-end session routed over at least a second slice corresponding to the configured piece of session information.

2. The routing method as claimed in claim 1, where the end-to-end session is ciphered by the terminal and deciphered by the application server.

3. The routing method as claimed in claim 1, where the end-to-end session is initialized by the terminal by configuring a default piece of session information.

4. The routing method as claimed in claim 1, where the piece of session information is a data element relating to a piece of NSSAI information.

5. The routing method as claimed in claim 1, further comprising the terminal storing in memory the at least one identifier received based on the communication parameters of the end-to-end session.

6. A determination method for determining at least one routing identifier of data of an end-to-end session initialized between a terminal and an application server, over a first network slice corresponding to a set of functions for processing the data of a communication infrastructure, implemented by the application server, and comprising:
determining at least one routing identifier based on at least one communication parameter of the end-to-end session,
transmitting to the terminal the at least one identifier determined, and
receiving from the terminal subsequent data of the end-to-end session routed over at least a second slice.

7. The determination method as claimed in claim 6, where the at least one parameter relates to a transport layer of the end-to-end session.

8. The determination method as claimed in claim 6, where the at least one parameter relates to a Quick User Datagram Protocol (UDP) Internet Connections (QUIC) protocol.

9. The determination method as claimed in claim 6, where the at least one parameter relates to a protocol version of the transport layer.

10. The determination method as claimed in claim 6, where the at least one identifier is transmitted in a data element of a transport protocol.

11. A device for routing data of an end-to-end session initialized between a terminal and an application server, over a first network slice corresponding to a set of data processing functions of a communication infrastructure, implemented by the terminal,
wherein the device comprises:
a receiver, configured to receive from the application server at least one routing identifier determined based on at least one communication parameter of the end-to-end session,
a processor, configured to configure a piece of session information on the basis of the at least one identifier received, and
a transmitter, configured to transmit to the application server subsequent data of the end-to-end session routed over at least a second slice corresponding to the configured piece of session information.

12. A device for determining at least one routing identifier of data of an end-to-end session initialized between a terminal and an application server, over a first network slice corresponding to a set of functions for processing the data of a communication infrastructure, implemented by the application server, wherein the device comprises:
a processor, configured to determine at least one routing identifier determined based on at least one communication parameter of the end-to-end session,
a transmitter, configured to transmit to the terminal the at least one identifier determined, and a receiver, configured to receive from the terminal subsequent data of the end-to-end session routed over at least a second slice.

13. A non-transitory computer-readable recording medium comprising a computer program recorded thereon, the computer program comprising instructions for implementing a routing method when the instructions are executed by a processor of a terminal, the routing method routing data of an end-to-end session initialized between the terminal and an application server, over a first network slice corresponding to a set of data processing functions of a communication infrastructure,
wherein the instructions configure the terminal to:
receive from the application server at least one routing identifier determined based on at least one communication parameter of the end-to-end session,
configure a piece of session information based on the at least one identifier received, and
transmit to the application server subsequent data of the end-to-end session routed over at least a second slice corresponding to the configured piece of session information.

14. A non-transitory computer-readable recording medium comprising a computer program recorded thereon, the computer program comprising instructions for implementing a determination method when the instructions are executed by a processor of an application server, the determination method for determining at least one routing identifier of data of an end-to-end session initialized between a terminal and the application server, over a first network slice corresponding to a set of functions for processing the data of a communication infrastructure,
  wherein the instructions configure the application server to:
    determine at least one routing identifier based on at least one communication parameter of the end-to-end session,
    transmit to the terminal the at least one identifier determined, and
    receive from the terminal subsequent data of the end-to-end session routed over at least a second slice.

* * * * *